United States Patent [19]
Vander Ploog et al.

[11] 3,852,516
[45] Dec. 3, 1974

[54] MOISTURE PROOF SPLICE ENCLOSURE FOR ELECTRICAL APPLICATION

[75] Inventors: Cornelius J. Vander Ploog, Pompton Plains, N.J.; Arnold W. Henry, Pomona, N.Y.; Franklin J. Connolly, Sparta, N.J.

[73] Assignee: Sola Basic Industries, Inc., Milwaukee, Wis.

[22] Filed: May 2, 1973

[21] Appl. No.: 356,281

[52] U.S. Cl.............. 174/71 R, 174/76, 174/84 R, 264/272
[51] Int. Cl............................................ H02g 15/08
[58] Field of Search............... 174/76, 77 R, 91–93, 174/88 R, 71 R, 72 R, 84 R; 264/272; 29/628; 174/71 R, 72 R, 84 R

[56] References Cited
UNITED STATES PATENTS
3,419,669  12/1968  Dienes............................ 174/76 X
3,499,972  3/1970  Smith.............................. 174/76 X

*Primary Examiner*—Darrell L. Clay
*Attorney, Agent, or Firm*—Smythe & Moore

[57] ABSTRACT

A sealed connection for electrical cables has a rigid plastic tubular member positioned over the connected ends of the conductors of the cables to be connected and a thermosetting electrically insulating material encloses the tubular member and is within the tubular member to surround the connected conductors. A mastic-plastic pad encloses the entire connection and has portions extending beyond the tubular member which portions are brought together over the cables and sealed thereto.

6 Claims, 8 Drawing Figures

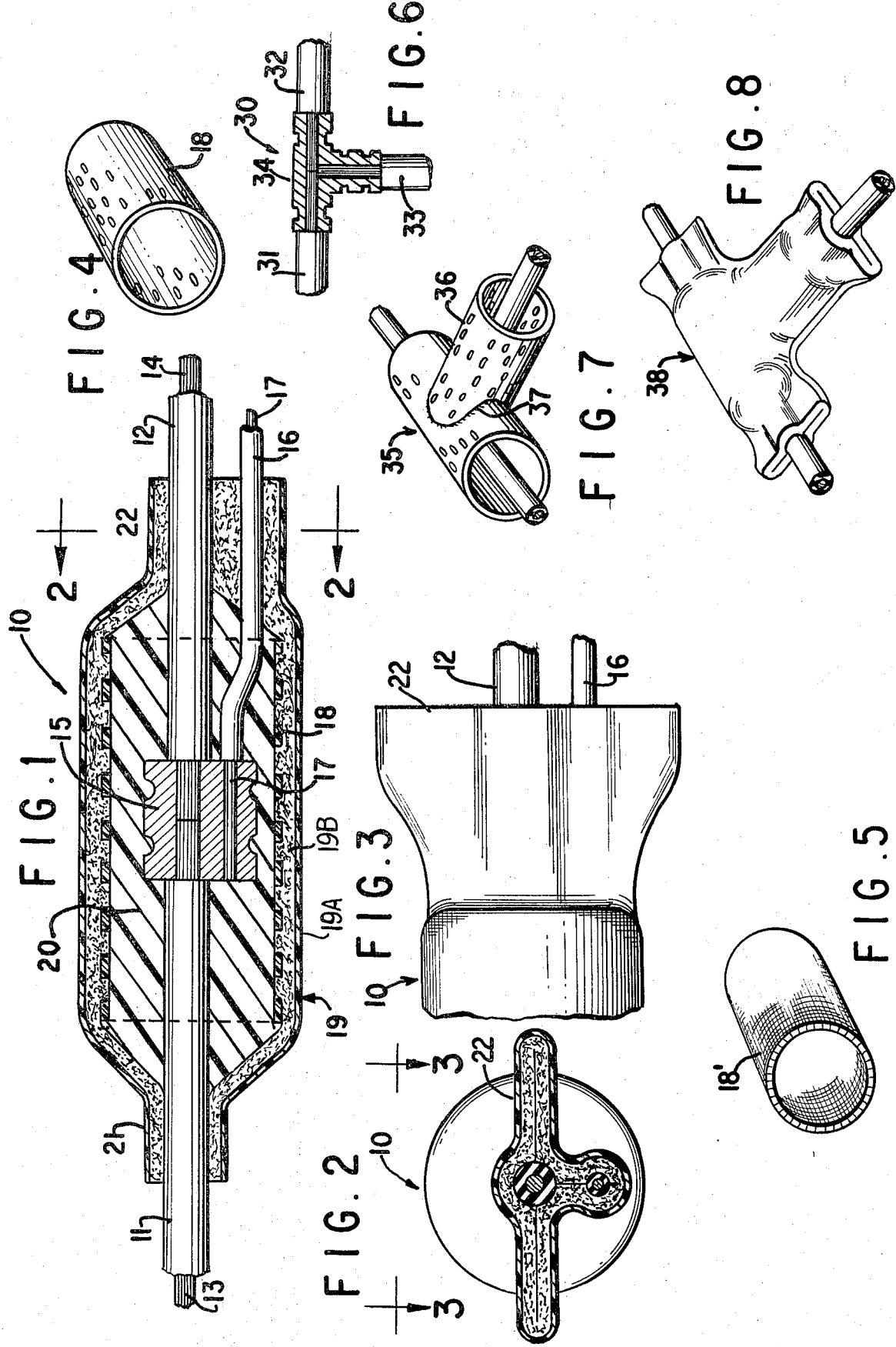

MOISTURE PROOF SPLICE ENCLOSURE FOR ELECTRICAL APPLICATION

The present invention relates to a sealed connection for electrical cables, and more particularly, to a reinforced connection in which the thickness of the insulation over the conductors can be controlled.

It has been known to connect or splice electrical cables by mechanically connecting the conductors of the cables, enclosing the connected conductors with a fluid or moldable electrically insulating material and then covering the material with an outer covering layer to protect the splice. The use of a fluid or flowable plastic material to cover the splice enables a moisture-proof connection to be formed. The outer covering layer had its ends sealed or clamped to the cable to additionally seal the interior of the splice against moisture. While such connections were generally satisfactory with respect to electrical conditions, mechanically the connections were not particularly strong. In an effort to improve the mechanical properties of such connections the plastic material surrounding the connected conductors was covered or enclosed with various forms of rigid housings which may be bonded to the plastic material and then sealed or clamped to the cables.

It is known that the ideal splice or connection matches the dielectric, chemical and physical characteristics of the cables. However, in actual practice it is not always economically feasible to obtain an ideal match. As a result, many different materials and design concepts have been proposed in an attempt to incorporate a high degree of compatability between the cable and the splices. In addition, to obtain a high degree of compatability which would produce an acceptable level of service reliability, there must be strict adherence to specified insulation procedures. The installation personnel must be highly skilled and must be sufficiently disciplined to adhere to safe work procedures and precautions in order to prevent contamination of the cable and splice materials during insulation of the splice. Since the effectiveness of an individual cable would depend upon the skill and experience of the personnel, various connection and enclosure structures have been proposed to reduce to a minimum reliance upon the skill of the personnel.

One of the objects of the present invention is to provide a novel and improved sealed connection or splice for electrical cables.

Another of the objects of the present invention is to provide such a sealed connection wherein the thickness of the insulation over the conductors can be effectively controlled with a minimum of effort.

Another of the objects of the invention is to provide such a sealed connection which incorporates a simple reinforcing structure which also protects the splice during its insulation.

Another of the objects of the invention is to provide an improved process for connecting electrical cables to form a moisture-proof splice or enclosure.

According to one aspect of the present invention, a sealed connection for electrical cables may comprise means for connecting the ends of the conductors of the cables to be connected. A rigid plastic tubular member is positioned over the connecting means and cable ends with this tubular member having a diameter sufficient to define a space between the cables and the tubular member. A thermosetting electrically insulating material is within the space and also encloses the tubular member and is enclosed by a cover of electrically insulating material with portions of this cover extending beyond the ends of the tubular member. The extending portions of the cover are then brought together over the cables and sealed thereto to form a moisture-proof connection.

The process may comprise connecting the ends of the conductors of the cables to be connected and positioning a rigid tubular member over the connected cable ends so as to form a space between the tubular member and the cables. A mastic-plastic pad, or pad which has a synthetic plastic outside and a mastic material on the inside thereof, is then positioned over the tubular member and cable ends to form a pouch. An electrically insulating thermosetting material is then poured into the pouch to surround the cable ends and the tubular member. The ends of the pad are then brought together after pouring of the thermosetting material and these ends are sealed around the cables.

Other objects, advantages and features of the present invention will be apparent from the accompanying description and drawings, which are merely exemplary.

In the drawings:

FIG. 1 is a longitudinal sectional view of the sealed connection according to the present invention;

FIG. 2 is a sectional view taken along the line 2—2 of FIG. 1;

FIG. 3 is an elevational view of one end of the sealed connection as viewed along the line 3—3 of FIG. 2;

FIG. 4 is a perspective view of a perforated tubular member used in the connection of FIG. 1;

FIG. 5 is a view similar to that of FIG. 4 but showing a tubular member having a honeycomb construction;

FIG. 6 is a plan view of a Tee connection of three cable ends;

FIG. 7 is a perspective view of a modified tubular member having a T shape for use in the connection of FIG. 6; and FIG. 8 is an overall perspective view of a sealed Tee connection of FIGS. 6 and 7.

Proceeding next to the drawings wherein like reference symbols indicate the same parts throughout the various views, a specific embodiment and modifications of the present invention will be described in detail.

As may be seen in FIG. 1, a sealed connection according to the present invention is indicated generally at 10 and connects electrical cables 11 and 12. These electrical cables each have conductors 13 and 14 respectively therein, and the end of these conductors is connected by a standard connector 15 as known in the art. In this particular embodiment, a third cable 16 having an electrical conductor 17 therein is also connected to the connector 15.

A rigid plastic cylindrical member 18 as shown in FIG. 4 or 18' as shown in FIG. 5 is then positioned around the connector and extends outwardly over both ends of the connector to enclose portions of the cables 11 and 12. The tubular member 18 functions as a spacer and may even comprise sheet material. Preferably, the inner diameter of the tubular member 18 is significantly greater than the diameter of the connector and the cables so that a space is defined therebetween.

A mastic-plastic pad 19 is then applied over the tubular member 18 and to the portions of the cables 11 and 12 which form the splice. The mastic-plastic pad comprises an outside plastic sheet 19A with mastic material 19B interiorly thereof. The pad is formed into a pouch or envelope so as to be provided with an opening through which a pourable material can be subsequently introduced. The mastic is worked carefully over the cable and pressed firmly around the cables so as to form good seals at the joints.

A thermosetting plastic material is then poured into the pouch and hardens to form a secondary insulation indicated at 20. This pourable material will flow into the space between the tube 18 and the cables 11 and 12 and also around the tube 18 to enclose this tube in a mass of thermosetting material. This thermosetting material may be a resin such as an epoxy, polyurethane or the like and some typical pourable compound formulations which may be used are indicated as follows:

1

| | |
|---|---|
| Low viscosity epoxy resin based on bisphenol A | 80–120 |
| Liquid modified amine hardener | 80–120 |
| Tri dimethyl amino methyl phenol | 0.8–2.0 |
| Calcium carbonate | 80–100 |

2

| | |
|---|---|
| Low viscosity epoxy resin based on bisphenol A | 40–60 |
| Polyamide | 20–40 |
| Chlorinated biphenol | 10–30 |
| Flexiblizers | 0–50 |

After the thermosetting material has been poured into the pouch, the lips of the pouch through which the material was poured are brought together and tightly sealed so that seals 21 and 22 are formed over the cables to define the ends of the sealed connection.

The rigid plastic tube 18 or 18' provides protection to the splice during the critical hardening time and thus keeps any distortion of the joint at a minimum. In addition, after the thermosetting material has cured, the tubular member provides further reinforcement against mechanical damage and significantly increases the strength of the joint.

The thickness of the insulation over the conductors can be readily controlled by selecting a suitable diameter of the plastic tube. Further control can be made by the introduction of spacer elements within the tube so as to prevent any collapse of the tube during the pouring operation.

In FIGS. 6 through 8 there is shown a Tee connection which is indicated generally at 30 in FIG. 6 and which consists of cables 31, 32, and 33 with their bared conductor ends being connected by a T-shaped connector 34. A similarly T-shaped spacer 35 as shown in FIG. 7 is positioned over the Tee connection. The stem portion 36 of the Tee spacer can be applied separately and then bonded to the cylindrical portion of the spacer by a suitable adhesive indicated at 37.

The assembly is then covered with a pad 38 shown in FIG. 8 which is similar to the pad employed in FIG. 1 but has a T configuration. A suitable thermosetting material is then poured into the pad, allowed to cure, and the result is a sealed connection which is similar in all respects to the connection of FIG. 1 except for the Tee configuration.

It is therefore apparent that the present invention provides a sealed moisture-free splice which provides primary electrical insulation with the mastic pad and a secondary insulation with the pourable thermosetting resin. The thickness of a secondary insulation can be precisely controlled by the diameter of the tubular element or the number of thicknesses or layers of the element. This sealed connection can be readily applied to an infinite number of splice configurations such as Tee splices, Wye splices, and H splices without the hindrance of a confining outer shell. Splices can be placed in service immediately, and there is no waiting for the thermosetting material to cure or harden. For severe mechanical applications, a reinforcing fabric may also be applied around the pad. The entire sealed connection is characterized by providing excellent electrical protection together with a strong joint.

The tubular members also could take various configurations.

It will be understood that changes in various details of construction and arrangement of parts may be made without departing from the spirit of the invention except as defined in the appended claims.

What is claimed is:

1. A sealed connection of electrical cables comprising means connecting the ends of the conductors of the cables, a rigid plastic tubular member positioned over said connecting means and cable ends and having a diameter larger than the diameter of said connection means to define a space between said cables and said tubular member, a thermoset electrically insulating material within such space and enclosing said tubular member, and a cover of electrically insulating material enclosing said thermoset material and extending beyond the ends of said tubular member, the cover ends being brought together over the cables and sealed to form a moisture-proof connection.

2. A sealed connection as claimed in claim 1 wherein said tubular member is perforated.

3. A sealed connection as claimed in claim 1 wherein said tubular member comprises a honeycomb.

4. A sealed connection as claimed in claim 1 where said tubular member comprises a cylinder.

5. A sealed connection as claimed in claim 1 wherein there are three cables connected in a T-shape configuration and said tubular member has a T-shape for said configuration.

6. A sealed connection of electrical cables comprising means connecting the ends of the conductors of the cables, a rigid plastic tubular member positioned over said connecting means and cable ends and having a diameter larger than the diameter of said connection means to define a space between said cables and said tubular member, a thermoset electrically insulating material within said space and enclosing said tubular member, and a cover of electrically insulating material enclosing said thermoset material and extending beyond the ends of said tubular member.

* * * * *